United States Patent [19]
Siira

[11] Patent Number: 6,038,458
[45] Date of Patent: *Mar. 14, 2000

[54] METHOD FOR SELECTING A SIGNAL, AND A CELLULAR RADIO SYSTEM

[75] Inventor: Mikko Siira, Tokyo, Japan

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/774,600

[22] Filed: Dec. 30, 1996

[51] Int. Cl.7 .................................................. H04Q 7/20
[52] U.S. Cl. .......................... 455/560; 455/422; 455/524
[58] Field of Search .................................. 455/422, 436, 455/503, 524, 525, 460, 442; 370/331

[56] References Cited

U.S. PATENT DOCUMENTS

| | | |
|---|---|---|
| 5,172,396 | 12/1992 | Rose, Jr. . |
| 5,181,200 | 1/1993 | Harrison .................................. 455/525 |
| 5,195,090 | 3/1993 | Bolliger et al. ......................... 455/436 |
| 5,268,933 | 12/1993 | Averbuch . |
| 5,293,380 | 3/1994 | Kondo . |
| 5,388,102 | 2/1995 | Griffith . |
| 5,434,854 | 7/1995 | Focarile et al. .......................... 455/442 |
| 5,586,119 | 12/1996 | Scribano . |
| 5,682,416 | 10/1997 | Schmidt et al. ......................... 455/436 |
| 5,742,640 | 4/1998 | Haoui et al. ............................. 455/560 |
| 5,768,308 | 6/1998 | Pon et al. ................................. 455/560 |
| 5,771,452 | 6/1998 | Hanley et al. ........................... 455/560 |
| 5,787,360 | 7/1998 | Johnston et al. ........................ 455/525 |
| 5,825,760 | 10/1998 | Siira ........................................ 455/442 |

*Primary Examiner*—Dwayne D. Bost
*Assistant Examiner*—Nay Maung
*Attorney, Agent, or Firm*—Pillsbury Madison & Sutro LLP

[57] ABSTRACT

A method for selecting a signal used in a cellular radio system having base stations and a vocoder encoding a signal. The vocoder is operationally connected to the base stations via transmission paths of different lengths. The base stations receive a signal encoded by the vocoder in the forward direction and transmit a signal to the vocoder in the reverse direction. The cellular radio system includes selectors that are separate from the base stations and that are arranged to select at least one signal to be transmitted to the vocoder from the signals received by the base stations in the reverse direction. The selectors are arranged to distribute to the base stations the signal arriving from the vocoder in the forward direction.

14 Claims, 3 Drawing Sheets

METHOD FOR SELECTING A SIGNAL, AND A CELLULAR RADIO SYSTEM

FIELD OF THE INVENTION

The invention relates generally to telecommunication systems. More precisely, the invention relates to a digital cellular radio system employing a soft hand-off.

BACKGROUND OF THE INVENTION

A typical cellular radio system comprises a fixed base station network, and a plurality of subscriber terminals, each of which communicates with one or more base stations of the network. A base station forwards the communication that arrives from a subscriber terminal. While moving or remaining stationary, subscriber terminals may transmit messages via the base stations both to each other and to subscriber terminals of other telephone systems. The transmission of messages is possible when the subscriber terminals are located in the coverage area of the base station network. In order for a subscriber terminal to be able to use the services provided by the cellular radio system, it should maintain a connection to at least one base station under all circumstances. When a subscriber terminal does not use the services provided by the base station network, it does not need a connection to the base station network but it listens to the base stations in an idle mode. When the subscriber terminal moves in the base station network from the coverage area of one base station to the coverage area of another base station, this creates a need to change the channel or the base station.

In a typical cellular radio system, a subscriber terminal communicates only with one base station at a time, even though, especially for example in a CDMA system, the subscriber terminal may also communicate simultaneously with several base stations. In a prior art soft hand-off, the connection to the base station network is maintained despite the hand-off. In such a hand-off, the base station is usually changed. The prior art also comprises a softer hand-off where the base station is not changed, but the sector of the base station used is changed. A soft and a softer hand-off are called make-before-break-type hand-offs, which means that a new connection is set up for the subscriber terminal before the connection to the previous base station is terminated. The frequency band used is not changed in either a soft or a softer hand-off.

A cellular radio system usually comprises a vocoder that is placed in a TRAU (Transcoder/Rate Adaptor Unit). The TRAU is placed for example in connection with a base station controller or a mobile services switching center. The TRAU source-encodes the signal and adapts the signal transmission rate to the transmission network, for example a Public Switched Telephone Network (PSTN). The TRAU forms TPAU frames that it transmits to the base station. The vocoder encodes, for example speech. The coding reduces the signal data rate, for example in a transmission line to the base station. The vocoder and the base station transmit to and receive from each other data packets that form TRAU frames.

In a soft hand-off, a subscriber terminal communicates with a plurality of base stations simultaneously. In a soft hand-off, the subscriber terminal transmits signals containing the same information to the base stations, the signals being forwarded to the vocoder. Also, the subscriber terminal receives signals containing the same information from the base stations. In cellular radio systems, the signal routing from the vocoder to the different base stations varies considerably.

In a prior art cellular radio system, the data transmission between the vocoder and the base station is realized in such a way that the vocoder transmits, during a soft hand-off, data packets containing the same information to at least two base stations. In such a hand-off situation, the data packets containing the same information and transmitted by the vocoder take up capacity of the transmission path between the vocoder and the base station. Also, transmitting the same data packet along different transmission paths delays the data packets in different ways, which creates problems in the data transmission.

SUMMARY OF THE INVENTION

The object of the present invention is to realize a cellular radio system wherein the signal forming the connection between the vocoder and the base station is selected in such a way that the capacity of the transmission path is saved and the number of problems caused by the delay is decreased.

This is achieved with a method according to the invention for selecting a signal, the method being used in a cellular radio system comprising base stations and a vocoder encoding a signal, the vocoder being operationally connected via transmission paths of different lengths to the base stations, which receive a signal in the forward direction and which transmit a signal in the reverse direction, the method comprising the steps of selecting at least one signal for transmission to the vocoder from the signals arriving at the base stations from the reverse direction, and distributing to the base stations the signal transmitted by the vocoder in the forward direction in such a way that the distribution is carried out separately from the vocoder.

The invention also relates to a cellular radio system comprising base stations and a vocoder encoding a signal, the vocoder being operationally connected via transmission paths of different lengths to the base stations, which receive a signal encoded by the vocoder in the forward direction and which transmit a signal in the reverse direction to the vocoder, the cellular radio system comprising selection means that are separate from the base stations and that are arranged to select at least one signal to be transmitted to the vocoder from the signals received by the base stations in the reverse direction, the selection means being arranged to distribute to the base stations the signal arriving from the vocoder in the forward direction.

The invention further relates to a cellular radio system comprising base stations and a vocoder encoding a signal, the vocoder being operationally connected via transmission paths of different lengths to the base stations, which receive a signal encoded by the vocoder in the forward direction and which transmit a signal in the reverse direction to the vocoder, the cellular radio system comprising selection means that are separate from the vocoder and that are arranged to select at least one signal to be transmitted to the vocoder from the signals received by the base stations in the reverse direction, the selection means being arranged to distribute to the base stations the signal arriving in the forward direction, in which cellular radio system the base stations are concatenated in such a way that the signals distributed and selected by the selection means propagate via successive base stations to the next base station.

The arrangement according to the invention provides several advantages, especially in a soft hand-off. The cellular radio system according to the arrangement comprises selection means which select preferably one of the signals arriving from the reverse direction and forward the signal to the vocoder. Since not all the signals transmitted by the base stations participating in the hand-off are transmitted to the vocoder, the data transmission over the transmission path can be decreased and capacity is saved for some other use.

The selection means also receive signals that are transmitted by the vocoder in the forward direction and the selection means distribute them to the base stations. The signal distribution takes place in such a way that each base station obtains a signal having the same contents, corresponding to the signal transmitted by the vocoder. Since the vocoder must transmit a signal that is supplied to each base station only at a later stage, the capacity of the transmission path between the vocoder and the base station is saved. The distribution of signals is also carried out near the base stations, so that the signals arrive substantially simultaneously at the base stations. The signal distribution is preferably carried out at the base station. The positioning of the selection means in the base station enables substantially similar transfer delays for the transmission paths between the selection means and the base stations.

BRIEF OF THE DRAWINGS

In the following, the invention will be described in greater detail with reference to the examples according to the accompanying drawings, in which.

DESCRIPTION OF THE PREFERRED EMBODIMENTS

Figure 1:
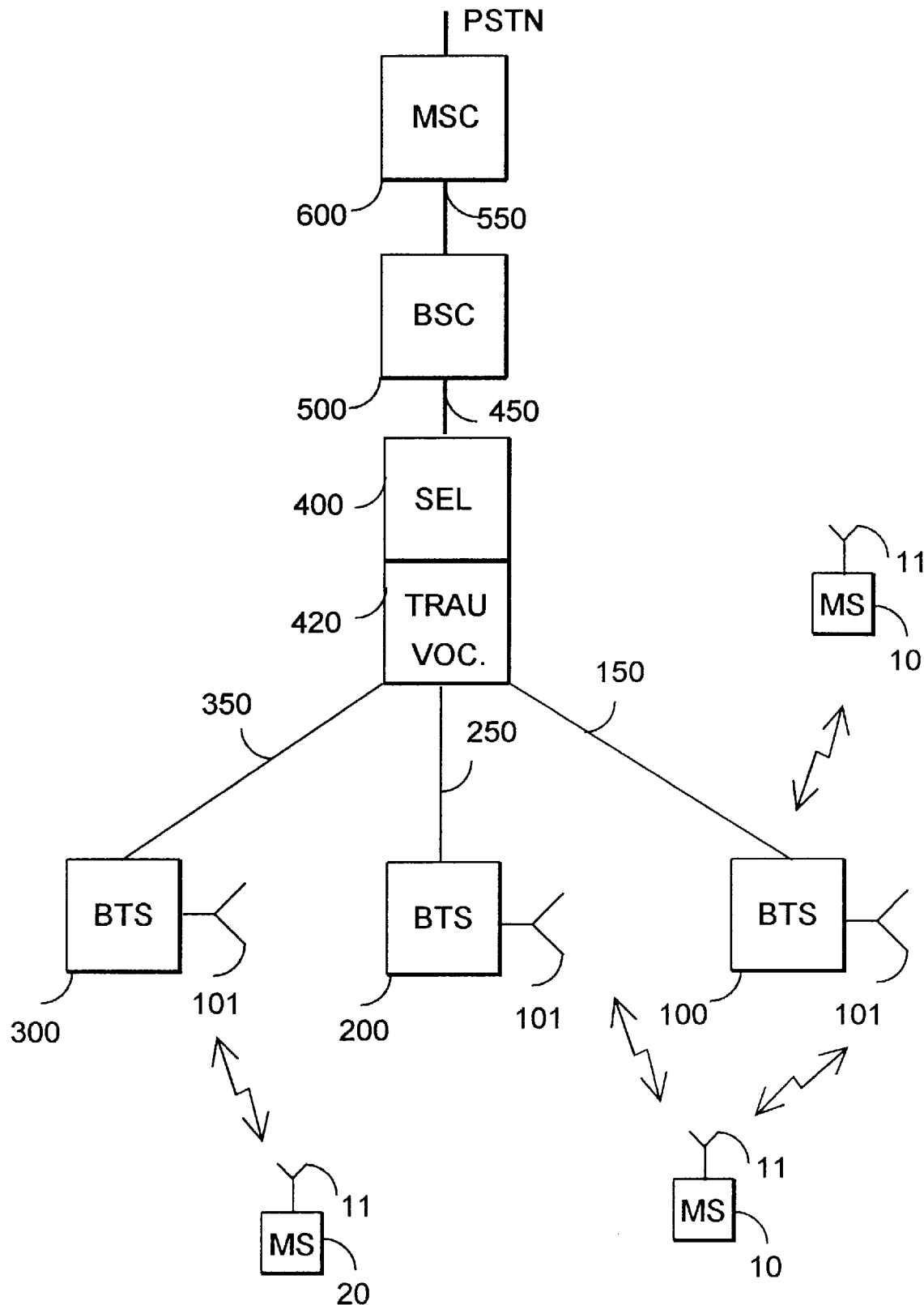
FIG. 1 shows a prior art cellular radio system.

FIG. 1 shows a prior art cellular radio system. The cellular radio system shown in the figure comprises base stations 100, 200, 300. The base station 100, 200, 300 comprises an antenna 101 that acts as a transceiver antenna. The cellular radio system also comprises a base station controller 500 and a mobile services switching center 600. The function of the base station controller 500 is to control the base stations 100, 200, 300. The cellular radio system further comprises a TRAU 400 that acts as a speech coder, or a vocoder. The mobile services switching center 600 is connected by a transmission line 550 to the base station controller 500, which is connected to the vocoder 400 by a transmission line 450. The vocoder 400 communicates via a transmission line 150 with the base station 100, via a transmission line 250 with the base station 200, and via a transmission line 350 with the base station 300. The cellular radio system further comprises a number of subscriber terminals 10, 20.

The vocoder 400 receives a signal having a rate of, for example 64 kbit/s and arriving from the PSTN via the mobile services switching center 600 and the base station controller 500. The vocoder 400 reduces the signal rate and places the signal in TRAU frames. After the rate decrease the signal rate will be, for example 16 kbit/s. In the opposite direction, the vocoder 400 receives a signal having a rate of 16 kbit/s, transmitted by the base stations 100, 200, 300, and the vocoder adapts the signal rate so that it is suitable for the PSTN.

Assume that in the cellular radio system shown in FIG. 1, the base stations 100, 200, 300 participate in a soft hand-off.

During a hand-off, the base stations 100, 200, 300 transmit signals containing the same information in the reverse direction to the vocoder 400. In the aforementioned situation, the signal to be transmitted over the transmission paths 150, 250, 350 consists, for example of data packets that contain the same information or data. In other words, the vocoder 400 receives three identical signals each having the rate of 16 kbit/s. The vocoder 400 also transmits signals containing the same information in the forward direction to each base station 100, 200, 300. The vocoder 400 therefore transmits three identical signals each having the rate of 16 kbit/s.

The base station 100, 200, 300 receives the signal transmitted by the vocoder 400 and forwards the signal via the radio path, for example to the subscriber terminal 20. The base stations 100, 200, 300 transmit simultaneously. In the cellular radio system, a great deal of data is thus transmitted during a soft hand-off, and the data transmission loads the transmission paths 150, 250, 350. Also, the lengths of the transmission paths 150, 250, 350 vary a great deal in practice, so that the base stations 100, 200, 300 receive at different times the data packets transmitted by the vocoder 400. In the arrangement shown in FIG. 1, the base station controller 500 receives from the reverse direction a PCM signal having typically a rate of, for example 64 kbit/s.

Figure 2:
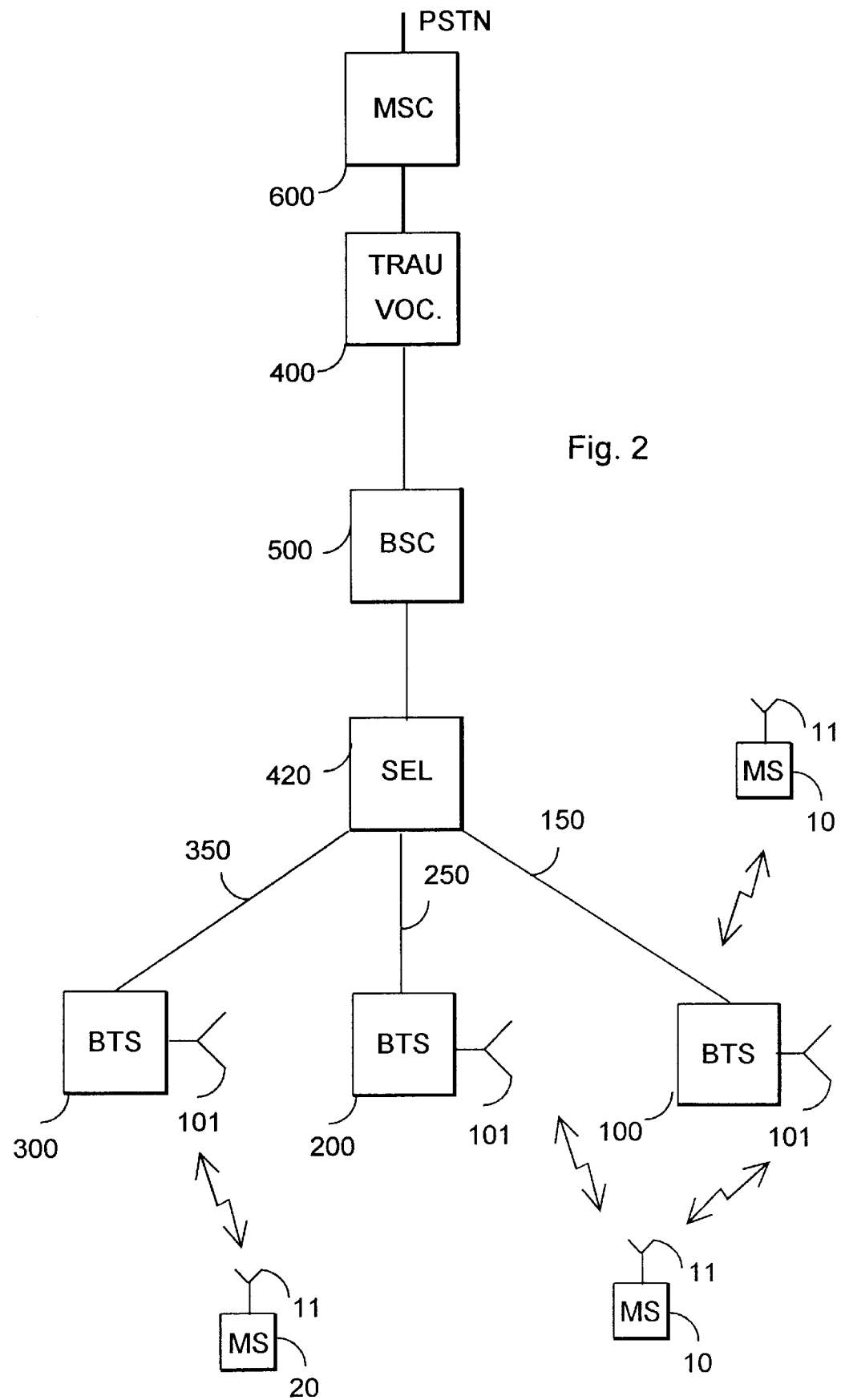
FIG. 2 shows a first embodiment of the cellular radio system where the method according to the invention is utilized.

FIG. 2 shows a first embodiment of the cellular radio system according to the invention. The arrangement according to the invention is applicable for use in spread spectrum systems, especially in CDMA systems, without restricting the invention to the aforementioned systems, however. The cellular radio system comprises a number of subscriber terminals 10, 20. The subscriber terminals comprise an antenna 11 that acts as a transceiver antenna. The cellular radio system also comprises base stations 100, 200, 300, a base station controller 500 and a mobile services switching center 600. The function of the base station controller 500 is to control the base stations 100, 200, 300. The subscriber terminals 10, 20 shown in the figure are realized according to known technology. The subscriber terminals are in practice, for example mobile phones.

The cellular radio system further comprises a vocoder 400 that acts as a speech coder. As regards speech coding, the vocoder is realized according to known technology. In the arrangement shown in the figure, the vocoder 400 is placed between the mobile services switching center 600 and the base station controller 500. Also in the arrangement shown in the figure, the functional distance of the vocoder 400, i.e. the length of the connection, to the mobile services switching center 600 is shorter than the length of the connection to the base station controller 500. In practice, the vocoder 400 may be located in connection with the mobile services switching center 600. The advantageous location of the vocoder 400 enables the signal rate of 16 kbit/s between the base station controller 500 and the vocoder 400. In the arrangement shown in FIG. 2, the capacity of the transmission path is saved compared to the prior art arrangement.

During a hand-off, the subscriber terminal 10 communicates with at least two base stations 100, 200, 300 and transmits a signal simultaneously to these base stations. The signal transmitted by the subscriber terminal 10 comprises data placed in data packets. The base stations 100, 200, 300 receive the signals transmitted simultaneously by the subscriber terminal, and they forward their signals in the reverse direction.

The cellular radio system shown in FIG. 2 comprises selection means 420 for processing the signals transmitted by the base stations 100, 200, 300 during a hand-off. The selection means 420 process the signals in such a way that the need for data transmission in the cellular radio system decreases. The selection means 420 decrease especially the data transmission between the base stations 100, 200, 300 and the vocoder 400. In the arrangement shown in FIG. 2, the selection means 420 are placed as near the base stations 100, 200, 300 as possible. The selection means 420 are situated preferably in the base station 100, 200, 300. The selection means 420 are arranged to select the signals to be transmitted in the reverse direction to the vocoder 400 from the signals arriving at the base stations 100, 200, 300. In the arrangement shown in the figure, the selection means 420 are separate from the vocoder 400.

In the forward direction, the vocoder 400 encodes the signals arriving from the mobile services switching center and forwards the signals via the base station controller 500 to the selection means 420. The selection means 420 receive the transmitted signals and distribute them to the base stations 100, 200, 300. The signal distribution is carried out in such a way that the selection means 420 transmit a signal containing the same information to each base station 100, 200, 300. The selection means 420 do not necessarily change the contents of the signal. In the forward direction, the vocoder 400 preferably transmits a signal having the rate of 16 kbit/s. The cellular radio system according to the invention therefore requires in the forward direction preferably only one 16 kbit/s connection, the data of the connection being copied to several base stations 100, 200, 300.

The selection means 420 are arranged to compare with each other the signals containing the same information and transmitted by the base stations 100, 200, 300 in the reverse direction. After the comparison, the selection means 420 transmit the signal of the selected base station via the base station controller 500 to the vocoder 400. For further transmission to the vocoder 400, the selection means 420 select for example the signal of the base station 100, 200, 300 that transmits a signal with data of the best quality. The signal quality may be based, for example on the bit error measurement of the signal. The quality may also be based, for example on an SNR (Signal to Noise Ratio) measurement carried out at the air interface. Further, the measurement of the signal quality may be based on quality information obtained from convolutional coding, on the use of a checksum of parity bits in block decoding, or on combinations of the aforementioned methods, without restricting the invention thereto, however. In the arrangement shown in the figure, the base station controller 500 controls the operation of both the selection means 420 and the vocoder 400. Since the selection means 420 are placed near the base stations 100, 200, 300, the signal delay differences are small during a hand-off. The delay differences are small since the signals transmitted by the selection means 420 arrive substantially simultaneously at the base stations 100, 200, 300. The base stations receive the signals substantially simultaneously, since the length of the connection between the selection means 420 and the base stations 100, 200, 300 is small compared, for example to the prior art arrangement.

Figure 3:
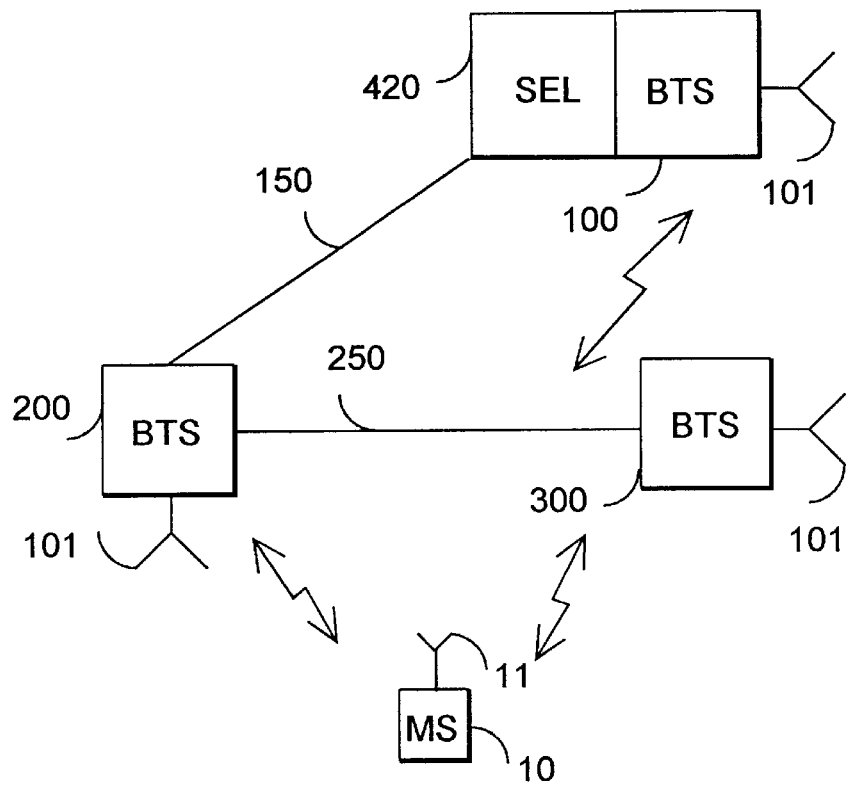
FIG. 3 shows a second embodiment of the cellular radio system where the method according to the invention is utilized.

FIG. 3 shows a second embodiment of the cellular radio system according to the invention. In the arrangement shown in the figure, the base stations 100, 200, 300 are concatenated. In the arrangement shown in the figure, the base stations 100, 200, 300 receive, during a soft hand-off, a signal transmitted by the subscriber terminal 10. The signal received by the base station 300 is supplied via the transmission path 250 to the base station 200 from where the signal propagates along the transmission path 150 to the base station 100. The base station 100 comprises selection means 420. The signal received by the base station 200 in the reverse direction is supplied directly via the transmission path 150 to the selection means 420. The selection means 420 compare the signals received by the base stations 100, 200, 300 in the reverse direction, the signals being in practice data packets containing data. After the comparison, the selection means 420 select the signal with the best quality and forward the selected signal to the vocoder 400.

In the forward direction, the vocoder 400 transmits a signal via the base station controller 500 to the selection means 420 placed in the base station 100. The selection means 420 thereafter distribute the signal to the base stations 100, 200, 300. The distribution is carried out in such a way that each base station 100, 200, 300 receives, in the forward direction, a signal containing the same information. After the signal has been received, the base stations 100, 200, 300 transmit a signal containing the same information to the subscriber terminal 10. Since the signal distribution is carried out near the base stations 100, 200, 300, the need for data transmission especially between the base station 100 and the vocoder 400 decreases. The arrangement shown in FIG. 3 makes it possible to improve the degree of utilization of the capacity. The concatenation of the base stations enables the concentration of the transmission paths, wherefore the costs of setting up transmission paths are reduced. The concatenation also enables the concentration of traffic, so that the degree of utilization of the available capacity is improved.

Figure 4:
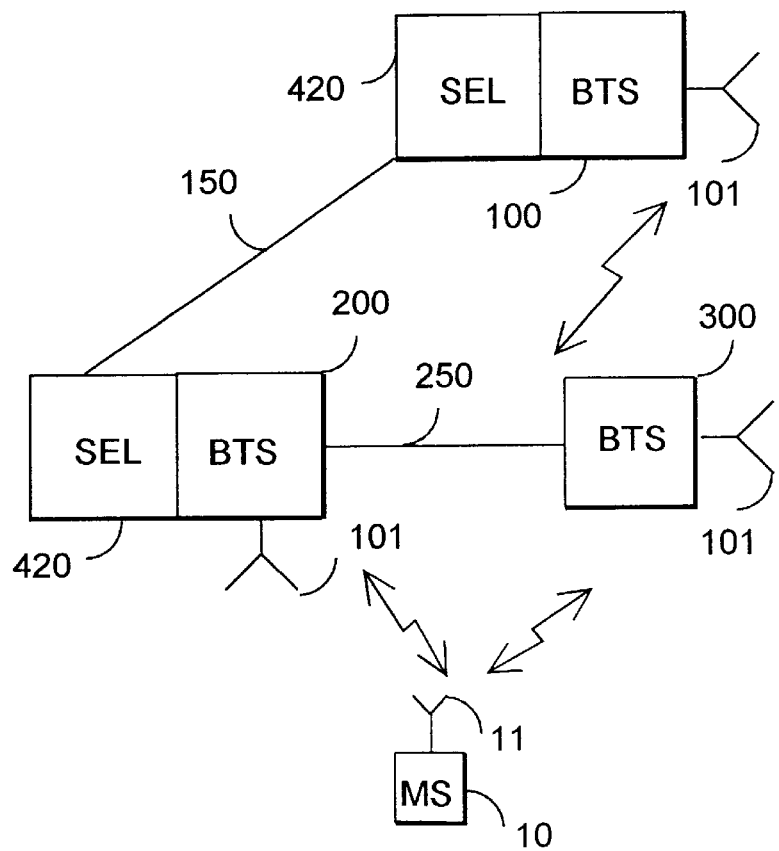
FIG. 4 shows a third embodiment of the cellular radio system where the method according to the invention is utilized.

FIG. 4 shows a third preferred embodiment of the cellular radio system according to the invention. In the arrangement shown in the figure, the base stations 100, 200 comprise selection means 420. In the arrangement shown in the figure, the base stations 100, 200, 300 receive, during a soft hand-off, a signal transmitted by the subscriber terminal 10. The base station 300 and the base station 200 are connected by a transmission path 250. The base station 200 is connected via a transmission path 150 to the base station 100. The signal received by the base station 300 is supplied via the transmission path 250 to selection means 420 provided at the base station 200. The selection means 420 of the base station 200 compare the signal arriving from the base station 300 to the signal received by the base station 200. On the basis of the comparison, one of the aforementioned signals is supplied via the transmission path 150 to the selection means 420 of the base station 100. The selection means 420 of the base station 100 compare the quality of the signal arriving at the base station 100 via the radio path to the quality of the signal arriving from the selection means 420 of the base station 200. After the comparison, the signal of better quality is transmitted for example to the vocoder 400. The positioning of the selection means 420 at the base stations, as shown in FIG. 4, enables the selection of signals as early as possible, which in turn makes it possible to reduce the amount of data transmission. The above-described arrangement makes it possible to decrease the need for data transmission between the base stations.

Even though the invention is described above with reference to the example according to the accompanying drawings, it is clear that the invention is not restricted thereto, but it can be varied in several ways within the scope of the inventive idea disclosed in the appended claims.

I claim:

1. A method for selecting a signal in a cellular radio system which includes a plurality of base stations, a vocoder for encoding signals, and transmission paths of different lengths connecting said vocoder with respective ones of said base stations, so that said base stations are arranged to receive a respective signal in a forward direction and to transmit a respective signal in a reverse direction, said method comprising:

provide at least one selector, each said selector being located at a location which is geographically separated from said vocoder;

selecting by said at least one selector at least one reverse direction signal for transmission to said vocoder from signals arriving via respective ones of said transmission paths in said reverse direction;

distributing by said at least one selector a forward direction signal from said vocoder via respective ones of transmission said paths, in said forward direction, to respective ones of said base stations; and concatenating said base stations such that said transmission paths extend from base station to base station, and said forward direction signal propagates from base station to base station as one signal, wherein said selecting includes measuring and comparing a quality of said at least one reverse direction signal, and transmitting to said vocoder, a signal, from among said at least one reverse direction signal, having a highest quality.

2. The method of claim 1, wherein one of said transmission paths is a shortest transmission path connecting said vocoder with a respective one said base station, said method further comprising:

locating said at least one selector at said respective one said base station.

3. The method of claim 1, further comprising;

locating said at least one selector at one of said base stations.

4. The method of claim 1, wherein said concatenating said base stations to propagate said at least one reverse direction signal selected by said at least one selector from base station to base station to said vocoder, and to propagate said forward direction signal distributed by said at least one selector from base station to base station to respective ones of said base stations.

5. The method of claim 1, wherein said concatenating said base stations is such that said selecting and said distributing are carried out separately at said plurality of said base stations.

6. The method of claim 1, wherein said selecting of a signal having a highest quality is based on at least one of measuring correctness, measuring signal-to-noise ratio, obtained from convolutional coding, and use of a checksum of parity bits.

7. The method of claim 1, wherein said distributing includes causing each said forward direction signal, as propagated to respective ones of said base stations, to contain information, wherein said information contained in each said forward direction signal is the same.

8. The method of claim 1, further comprising:

conducting said method of selecting in conjunction with conducting a soft hand-off of a mobile station from one to another of said base stations, in which, when said selecting and said distributing, said one and another of said base stations both transmit a reverse direction signal and receive a forward direction signal containing information, wherein said information contained in said forward direction signal and said reverse direction signal is the same.

9. The method of claim 1, wherein said cellular radio system further includes a base station controller which controls said base stations, and a mobile services switching center, and wherein said providing further includes placing said vocoder in said mobile services switching center, said mobile services switching center being geographically separate from said base station controller.

10. A cellular radio system, comprising:

a plurality of base stations, said base stations being concatenated such that a plurality of transmission paths extend from base station to base station, and a forward direction signal propagates from base station to base station as one signal;

a vocoder for encoding signals;

said plurality of transmission paths of different lengths at least some of which are relative to one another, operationally connecting said vocoder to respective ones of said base stations, so that said base stations are arranged to receive, in a forward direction, signals encoded by said vocoder and to transmit, in a reverse direction, signals towards said vocoder; and a selector located geographically separately from said base stations, and arranged to select from among signals received by said base stations at least one signal for transmission to said vocoder and to distribute to respective ones of said base stations encoded signals arriving at said selector from said vocoder, wherein said selector measures and compares signal quality of signals transmitted by said base stations.

11. The cellular radio system of claim 10, wherein said plurality of paths include said base stations being concatenated so that signals selected and distributed by said selector propagate from base station to base station.

12. The cellular radio system of claim 10, wherein said selector selects from among said signals transmitted by said base stations a best quality signal, based on said measuring and comparing.

13. The cellular radio system of claim 10 or 11, wherein said selector is co-located with a respective one of said base stations and said one of said base stations having a shortest one of said transmission paths.

14. The cellular radio system of claim 10 or 11, further comprising:

a base station controller which controls said base stations; and a mobile services switching center, wherein said vocoder is located in said mobile services switching center, and wherein said mobile services switching center is geographically separate from said base station controller.

* * * * *